Feb. 23, 1965
L. P. ENGLISH
3,171,011
STUD WELDING DEVICE
Filed March 31, 1961
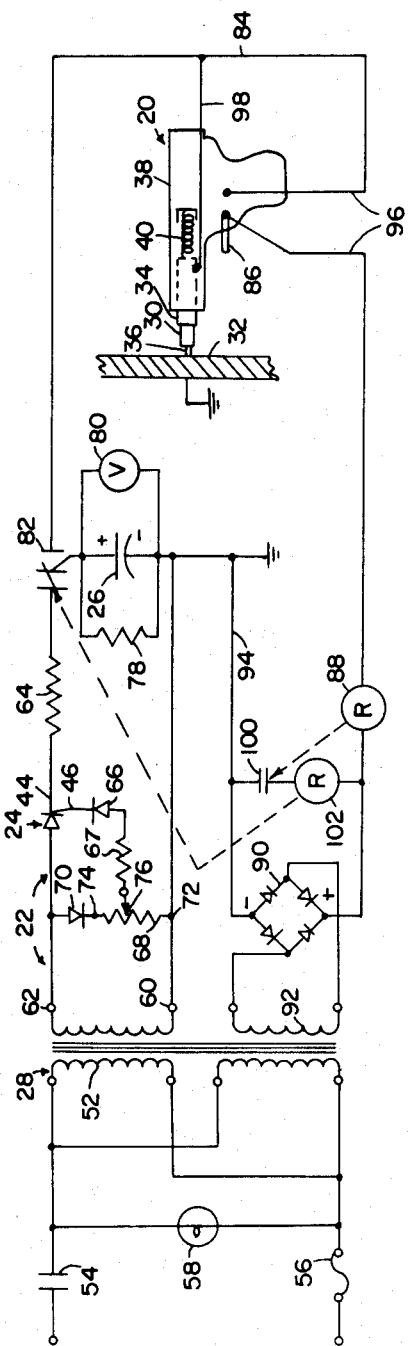
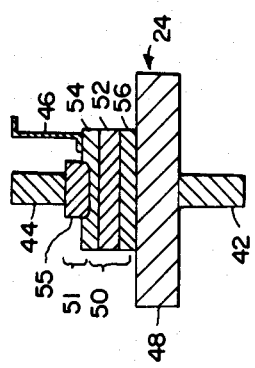
FIG. 2
FIG. 1
INVENTOR.
Lawrence P. English
BY
Morse & Altman
ATTORNEYS

United States Patent Office 3,171,011
Patented Feb. 23, 1965

3,171,011
STUD WELDING DEVICE
Lawrence P. English, Haddon Heights, N.J., assignor to KSM Products, Inc., Moorestown, N.J., a corporation of New Jersey
Filed Mar. 31, 1961, Ser. No. 99,839
5 Claims. (Cl. 219—98)

The present invention relates to electric welding and, more particularly, to stud welding devices for joining one end of an axially elongated stud to the surface of a laterally extended workpiece for any of a variety of purposes. For example, the outer end of the stud may be threaded to permit desired components to be fastened to the workpiece after the stud has been welded thereto.

A variety of electrical systems have been proposed for stud welding devices of the foregoing type. In one such system, the stud is biased toward the workpiece and power is supplied to the contiguous portions of the stud and the workpiece by the discharge of a capacitor. Here, the stud may be provided with a projection which is biased into pressure contact with the workpiece in such a way that discharge of the capacitor through the stud, projection and workpiece results in disintegration of the projection, heating of the contiguous portions of the stud and the workpiece to welding temperature and diffusion bonding of the portions together under the applied pressure. Or the stud may be released under bias toward the workpiece in such a way that when contact is made, the capacitor discharges to produce the weld. The present invention contemplates, for use with a stud welding device of either of the foregoing types, a novel capacitance discharge system of unusually small size, light weight, simple construction and effective operation.

The primary object of the present invention is to provide an unusually efficacious circuit of the foregoing type in which charging of the capacitor is effected from an alternating current source through a gating rectifier which automatically charges the capacitor to a predetermined limit that is determined by the bias on the gating rectifier. Although any one of a variety of gating rectifiers is contemplated for use in accordance with the present invention, a so-called "silicon controlled rectifier" to be described in detail below, is preferred.

Other objects of the present invention will in part be obvious and will in part appear hereinafter.

The invention accordingly comprises the apparatus possessing the construction, combination of elements and arrangement of parts which are exemplified in the following detailed disclosure, the scope of which will be indicated in the appended claims.

For a fuller understanding of the nature and objects of the present invention, reference should be had to the following detailed description taken in connection with the accompanying drawing wherein:

FIG. 1 is a schematic diagram of a stud welding system embodying the present invention; and FIG. 2 is an exaggerated cross-sectional view of a gating rectifier useful in the system of FIG. 1.

Generally, the illustrated system includes a stud welding gun 20 and a control circuit 22. Control circuit 22 includes a transformer 28 for supplying alternating current, a capacitor 26 for supplying welding current when charged and a silicon controlled rectifier 24 for charging capacitor 26 from transformer 28. Silicon controlled rectifier 24 and circuit 22 will be described in detail below. Gun 20 will be described next in conjunction with a stud 30 and a workpiece 32.

As shown, gun 20 includes a chuck 34 for holding stud 30, the tip of which is provided with a projection 36. Chuck 34 is reciprocable within the housing 38 of gun 20, being biased into its most outward position by a spring 40. The chuck is so designed as to be forced into housing 38 when the gun is manually directed against workpiece 32. Under these circumstances, projection 36 bears against workpiece 32. When a welding current is passed through stud 30, projection 36 and workpiece 32, projection 36 disintegrates in a manner known to the art and stud 30 is directed under the bias of spring 40 into contact with workpiece 32 at a time when the contiguous portions of the stud and the workpiece have been heated to welding temperature by the welding current which has disintegrated projection 36.

Silicon controlled rectifier 24, as indicated above, is the gating rectifier which applies direct current to capacitor 26 in response to alternating current from transformer 28. Generally, as shown in FIG. 2, silicon control rectifier 24 is similar to an ordinary rectifier which conducts only in the forward direction from an anode 42 to a cathode 44. However, in silicon controlled rectifier 24, a block occurs in the forward direction also until a small voltage, known as the firing voltage, is applied to a gate 46. Thereafter, conduction continues, even though the gate current is stopped, until the anode to cathode current is decreased below a given minimum, known as the holding current. Between the anode 42 and the cathode 44, in sequence, are a support 48, a PNP assemblage 50 and a PN assemblage 51. PNP assemblage consists of silicon strata 56, 52 and 54. PN assemblage 51 consists of silicon stratum 54 and gold-antimony stratum 55. Gate lead 46 is connected to stratum 54. In essence, gating rectifier 24 is a PNPN unit with a gate lead connected to the inner P stratum. In operation, the voltage between the gate and the cathode must be above a predetermined minimum before conduction will occur. After conduction occurs, the current will continue if the gate voltage is removed until the current decreases below a predetermined minimum at which the silicon controlled rectifier returns to the forward blocking state with the gate open. The operation is such that an alternating current applied to silicon controlled rectifier 24 will result in a direct current that continues to charge capacitor 26 but only until the current is decreased below the holding level as the result of the reverse effect of capacitor 26 and until the gate bias voltage in consequence is removed.

In reference now to the schematic diagram of FIG. 1, alternating current power is applied to the primary 52 of isolation transformer 28 through a suitable on-off switch 54 and a suitable fuse 56. A pilot light 58 indicates the state of switch 54. In consequence, an alternating voltage is developed between the secondary transformer terminals 60 and 62. When terminal 60 is negative with respect to terminal 62, current flows (in the direction of electron flow) from terminal 60 to capacitor 26 and from capacitor 26 through resistor 64 to the cathode of silicon controlled rectifier 24, through a diode 66 and gate resistor 67 through a selected portion of a potentiometer 68 between points 76 and 74, through a diode 70 and back to terminal 62.

Also, when terminal 60 is negative with respect to terminal 62, current flows through potentiometer 68 and through diode 70, causing a voltage drop from point 72 to point 74. Point 76, which is the selector of potentiometer 68, can be moved to select any voltage between zero and the maximum developed across potentiometer 68. This maximum is equal to the voltage between terminal 74 and terminal 72.

When the voltage across capacitor 26 rises to equal the voltage drop between point 72 and point 76, the voltage between gate 46 and cathode 44 of silicon control rectifier 24 will be zero. Thus, as the polarity between terminals 60 and 62 reverses every half cycle of the alternating current input, the current from cathode to anode drops to zero. At this time the current therefore is below the holding current so that silicon controlled rectifier 24 is switched to the non-conducting state. It remains in this state until gate current is caused to flow again as a result of actuation of switch 82 in a manner to be described below. Capacitor 26 is associated with a voltage regulating resistor 78 and a voltage indicating meter 80.

The positive terminal of capacitor 26 is connected to the center terminal of a single pole-double throw switch 82. The normally open outer terminal of switch 82 is connected through a lead 84 to chuck 34 and to one terminal of a trigger 86 of gun 20. The other terminal of trigger 86 is connected through a relay 88 to an output terminal of a rectifier bridge 90. The other output terminal of rectifier bridge 90 is connected to ground. The input terminals of rectifier bridge 90 are connected across a secondary 92 of transformer 28. When trigger 86 is closed, current flows from ground through lead 94, rectifier bridge 90, relay 88, leads 96, a lead 98, and stud 30 through workpiece 32 to ground. Relay 88 causes contact points 100 to close, energizing a relay 102. Relay 102 actuates single pole-double throw switch 82, causing a flow of welding current from capacitor 26 through lead 84, lead 98, chuck 34, stud 30 and projection 36 into workpiece 32.

In operation, potentiometer 68 may be adjusted to determine the maximum potential that can be built up by capacitor 26. Thereafter, manual biasing of gun 20 against workpiece 32, causes projection 36 to be pressed into contact against the surface of workpiece 32. Finally, actuation of trigger 86 causes relay 88 to operate switch 100 and relay 102 to operate single pole-double throw switch 82, directing current from capacitor 26 through chuck 34, stud 30 and projection 36 into workpiece 32. Following its discharge, charging of capacitor 26 once again ensues automatically by virtue of deenergizing of relay 88, opening of contact points 100, deenergizing of relay 102 and reversing of switch 82.

The present invention thus provides a capacitance discharge stud welding circuit of unusual simplicity capable of charging the storage capacitor and controlling its maximum voltage. Although the foregoing specifically described circuit involves a system in which a projection on the stud is based into contact with the workpiece when the welding current is supplied, it will be understood that the present invention may be applied as well to a system in which the stud is released under bias toward the workpiece from a position away from the workpiece when the welding current is supplied.

It will be understood that although the system of the foregoing disclosure incorporates a single silicon controlled rectifier for half wave rectification, two or more silicon controlled rectifiers in various configurations may be desired for full-wave, single phase or polyphase rectification.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:
1. For use in a stud welding apparatus of the type comprising a holder for a stud to be biased against a workpiece for welding by a charge of predetermined magnitude to cause welding of said stud to said workpiece, said stud and said workpiece constituting an electrical load, a capacitor across which may be generated a predetermined charge, a source of alternating current providing a pair of terminals, a gating rectifier including an input terminal, an output terminal and a gate terminal, a first diode including an input terminal and an output terminal and a second diode including an input terminal and an output terminal, said input terminal of said gating rectifier and said input terminal of said first diode being operatively connected to one terminal of said source, a potentiometer connected between the output terminal of said first diode and the other terminal of said source, said gate terminal of said gating rectifier and said output terminal of said second diode being operatively connected together, a resistor connected between a wiper of said potentiometer and the input terminal of said second diode, and means for use in connecting said capacitor across said electrical load.

2. In the combination of claim 1, said gating rectifier including a PNPN assemblage, said input and output terminals being joined at opposite faces to said assemblage, said gate terminal being joined to the inner P stratum of said assemblage.

3. For use in a stud welding apparatus of the type for a stud to be biased against a workpiece for welding by a charge of predetermined magnitude to cause welding of said stud to said workpiece, said stud and said workpiece constituting an electrical load, a capacitor across which may be generated a predetermined charge, a source of alternating current providing a pair of terminals, a gating rectifier including an input terminal, an output terminal and a gate terminal, a first rectifier including an input terminal and an output terminal and a second rectifier including an input terminal and an output terminal, said input terminal of said gating rectifier and said input terminal of said first rectifier being operatively connected to one terminal of said source, a potentiometer connected between the output terminal of said first rectifier and the other terminal of said source, said gate terminal of said gating rectifier and said output terminal of said second rectifier being operatively connected together, and means for connecting said capacitor across said electrical load, said gating rectifier including a PNPN assemblage, said input and output terminals being joined at opposite faces to said assemblage, said gate terminal being joined to the inner P stratum of said assemblage.

4. An energizing system comprising a capacitor across which may be generated a charge to be applied through an electrical load, a source of alternating current providing a pair of terminals, a gating rectifier including an input terminal, an output terminal and a gate terminal, a first diode including an input terminal and an output terminal and a second diode including an input terminal and an output terminal, said input terminal of said gating rectifier and said input terminal of said first diode being operatively connected to one terminal of said source, a potentiometer connected between the output terminal of said first diode and the other terminal of said source, said output of said gating rectifier and said output of said second diode being operatively connected together, a resistor connected between a wiper of said potentiometer and the input of said second diode, and means for connecting said capacitor across said electrical load, said gating rectifier including a PNPN assemblage, said input and output terminals being joined at opposite faces to said assemblage, said gate terminal being joined to the inner P stratum of said assemblage.

5. For use in a stud welding apparatus comprising a holder for a stud to be biased against a workpiece, said stud and said workpiece constituting an electrical load, a capacitor across which may be generated a charge of sufficient magnitude to cause a predetermined current to flow through said electrical load, a transformer as a source of alternating current providing a pair of terminals, a gating rectifier including an input terminal, an output terminal and a gate terminal, a first diode including an input terminal and an output terminal and a second diode including an input terminal and an output terminal, said input terminal of said gating rectifier and said input terminal of said first diode being operatively connected to one terminal of said source, a potentiometer connected between the output terminal of said first diode and the other terminal of said source, said gate terminal of said gating rectifier and said output terminal of said second diode being operatively connected together, switch means for connecting said capacitor across said electrical load, said gating rectifier including a PNPN assemblage, said input and output terminals being joined at opposite faces to said assemblage, said gate terminal being joined to the inner P stratus of said assemblage, said switch means including relay means and a bridge rectifier for transforming said alternating current from said source to direct current, said direct current being applied to said relay means upon actuation thereof when said switch means is actuated, said actuation of said relay means closing a connection between said capacitor and said electrical load.

References Cited by the Examiner

UNITED STATES PATENTS

| | | | |
|---|---|---|---|
| 2,250,102 | 7/41 | Klemperer | 171—97 |
| 2,342,144 | 2/44 | Hughes | 219—98 |
| 2,515,635 | 7/50 | Dawson | 219—113 |
| 2,763,755 | 9/56 | Graham | 219—98 |
| 2,998,561 | 8/61 | Rockafellow | 320—1 |
| 3,045,148 | 7/62 | McNulty et al. | 307—88.5 |
| 3,089,965 | 5/63 | Krezek | 307—88.5 |

OTHER REFERENCES

"Phase-Controlling Kilowatts With Silicon Semi-Conductor," reprint May 1959 of "Control Engineering" (G.E.).

RICHARD M. WOOD, *Primary Examiner.*